No. 861,341. PATENTED JULY 30, 1907.
J. B. WINTER.
SPEED INDICATOR FOR VELOCIPEDES, &c.
APPLICATION FILED JAN. 25, 1904.
2 SHEETS—SHEET 1.
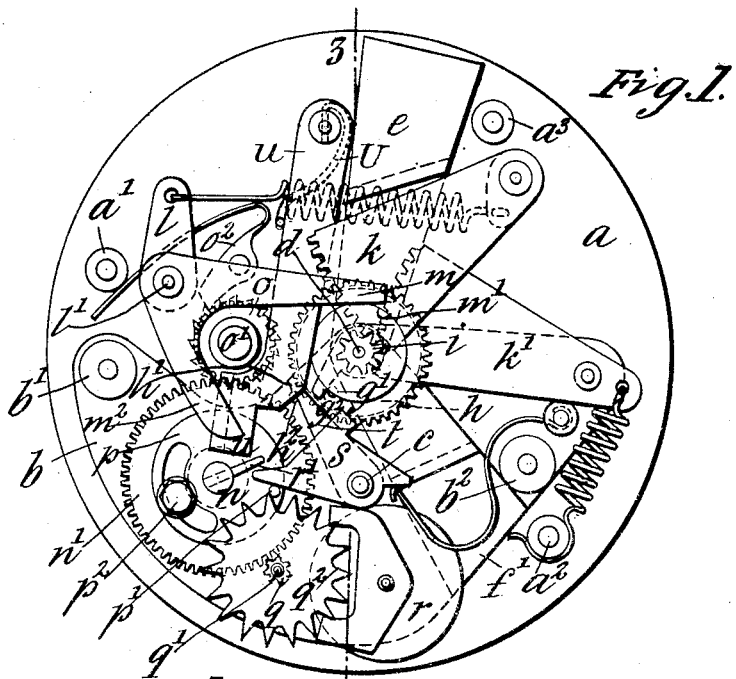
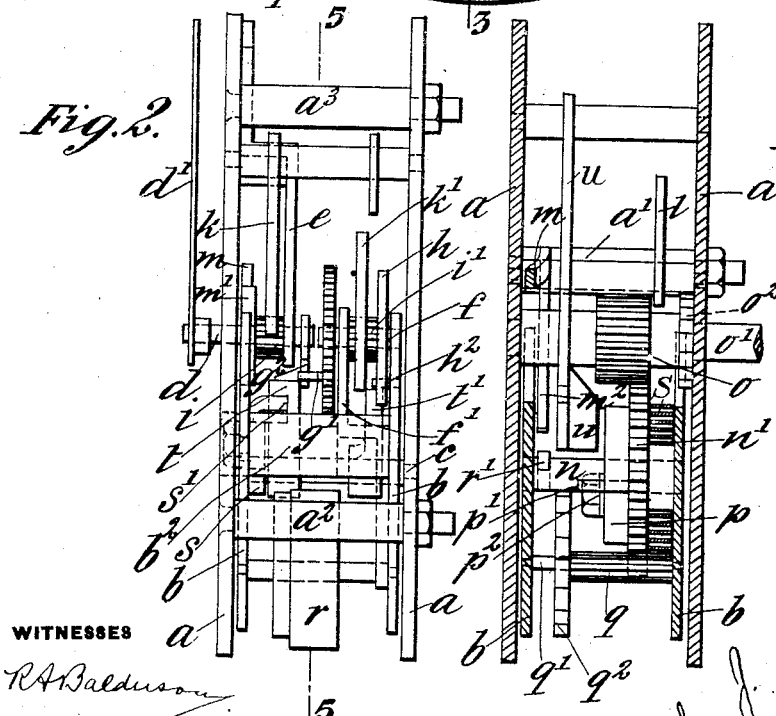
WITNESSES
R. A. Balduson
W. W. Swartz
INVENTOR
J. B. Winter,
by Bakewell & Byrnes,
his Attys.

No. 861,341.

PATENTED JULY 30, 1907.

J. B. WINTER.
SPEED INDICATOR FOR VELOCIPEDES, &c.
APPLICATION FILED JAN. 25, 1904.

2 SHEETS—SHEET 2.

WITNESSES

INVENTOR

UNITED STATES PATENT OFFICE.

JOHN BRADBURY WINTER, OF BRIGHTON, ENGLAND.

SPEED-INDICATOR FOR VELOCIPEDES, &c.

No. 861,341.

Specification of Letters Patent.

Patented July 30, 1907.

Application filed January 25, 1904. Serial No. 190,478.

*To all whom it may concern:*

Be it known that I, JOHN BRADBURY WINTER, a subject of the King of Great Britain and Ireland, residing at 28 Montpelier road, Brighton, in the county of Sussex, England, have invented certain new and useful Improvements in Speed-Indicators for Velocipedes and other Vehicles, of which the following is a specification, (for which I have applied for patents in Great Britain, filed 5th January, 1904; France, filed 5th January, 1904, and Belgium, filed 5th January, 1904.

In the specification to British Patent No. 5633 of 1899, there is described a speed indicator in which the nave of a vehicle wheel of known diameter is connected to a wheel of the indicating instrument through suitable gearing so that this wheel will revolve at a speed proportional to that of the vehicle. In the instrument is a clockwork driven by a spring and controlled by an escapement or a flier so as to operate for a given time, say a few seconds. When the clockwork is released, which may be effected automatically at every revolution of the geared wheel or of a spindle geared thereto, an index is for the time connected to the geared wheel and moves with it while the clockwork continues to operate during the pre-determined time at the end of which the index is disconnected from the geared wheel and remains stationary pointing to a division on a dial corresponding to the average speed of the vehicle during the time of operation of the clockwork.

Figure 4:
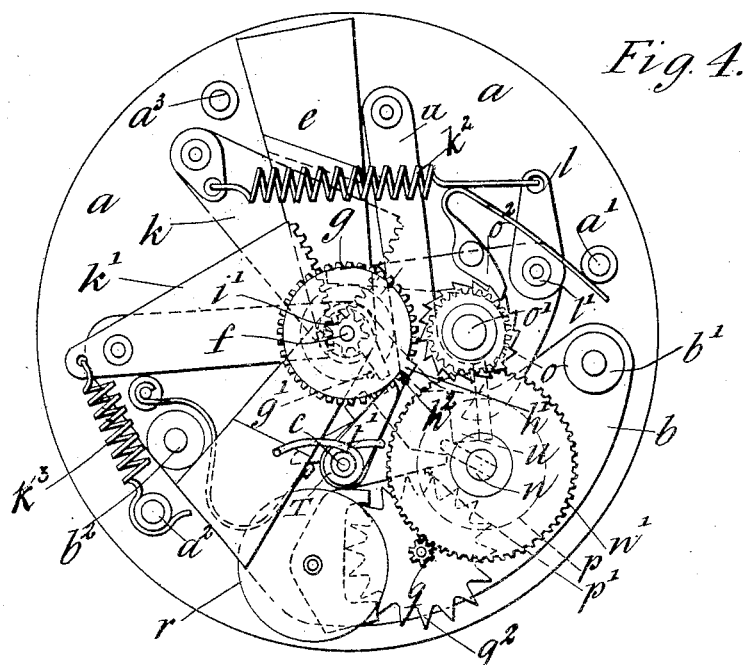
Figure 5:
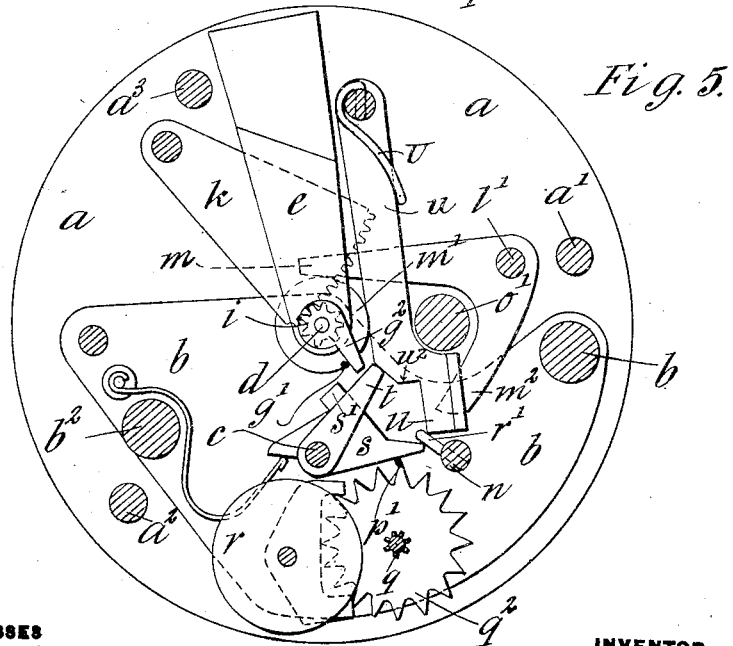

The present invention relates to improvements in the apparatus above referred to by which its efficiency is increased and its construction simplified as will be described with reference to the accompanying drawings, in which Figure 1 is a front elevation with the frame or casing removed; Fig. 2 is a side elevation; Fig. 3 a section on line 3—3 of Fig. 1. Fig. 4 is a rear elevation, and Fig. 5 a section on the central line of Fig. 2 looking from the right.

Within an outer frame consisting of two circular disks $a$ connected by pillars $a'$ $a^2$ $a^3$, is another frame consisting of two plates $b$ connected by two pillars $b'$ $b^2$, and mounted on a spindle $c$ which is journaled in the plates $a$.

Journaled centrally in the face plate $a$ which constitutes the dial plate of the instrument is a spindle $d$ which extends inwards to and is journaled in a cock $e$ fixed to the face plate, and carries on its outer end a pointer or index $d'$ which traverses the dial on the face plate. In line with the spindle $d$ is another spindle $f$ which is journaled in one of the inner plates $b$ and in a cock $f'$ fixed to that plate, and on which is fixed a toothed wheel $g$. A pin $g'$ projects from the wheel $g$ so as to encounter a lever $g^2$ fixed to the inner end of the spindle $d$ when either of the spindles, $d, f$, revolves. On the spindle $f$ there is also fixed a disk $h$ having a small tooth or projection $h'$ at one point of its periphery in the path of which is a pin $h^2$ projecting from the inner frame and thus limiting the rotation of the spindle $f$.

Fixed on the spindles $d, f$, respectively are pinions $i, i'$, with which are geared the toothed segments $k$, $k'$ pivoted respectively in the outer and inner frames. A tension spring $k^3$ connects the outer end of the segment $k'$ with the pillar $a^2$ with the result that the inner frame is rocked on the spindle $c$, as shown in Fig. 1, and also the pinion $i'$, with which the segment $k'$ is geared, and with it the shaft $f$, is rotated until the tooth $h'$ on the disk $h$ encounters the pin $h^2$ which projects from the plate $b$. The segment $k$ is connected by a similar spring $k^2$ with an arm $l$ fixed on a rocking shaft $l'$ which is journaled in the outer frame and carries a bent lever one arm $m$ of which is caused by the spring to bear on a disk $m'$ fixed on the spindle $d$ with sufficient friction to cause the lever $g^2$ to remain in any position in which it may be left by the pin $g'$.

On a spindle $n$ journaled in the inner frame is a spur wheel $n'$ which gears with a pinion $o$ fixed on a spindle $o'$ which is journaled in the fixed or outer frame and is driven in any suitable manner from the wheel of the vehicle preferably through a ratchet and pawl $o^2$ the ratchet being mounted on the spindle $o'$ so as to prevent the instrument from being driven backwards. Loosely mounted on the spindle $n$ is a slotted disk $p$ carrying a pin $p'$, the disk being arranged to be clamped to the wheel $n'$ in any desired position within the limits of adjustment by means of a clamping nut $p^2$. This adjustment is for the purpose of varying the position of the pin $p'$, and thereby controlling the time of its action for the purpose hereinafter described. The spur wheel $n'$ gears with a pinion $q$ which is fixed on a spindle $q'$ journaled in the inner frame on which also is fixed an escapement wheel $q^2$, the pallets of which are fixed on a spindle carrying a heavy disk $r$. When the wheel $n'$ driven by the gear wheel $o$ is made to revolve "clockwise" it winds a spring S (see Fig. 3) on the spindle $n$. A pin $r'$ projecting from the spindle $n$ moves a lever $s$ which is freely pivoted on the spindle $c$ so as to bring a projection $s'$ on the lever into engagement with an arm $t$ rigidly fixed on the spindle $c$. A second arm $t'$ fixed on the same spindle is normally urged by a spring T on the spindle to abut against the edge of the disk $h$ and act as a brake. When the arm $t$ is moved by the lug or projection $s'$, the brake $t'$ is released and the wheel $g$ is caused by the segment $k'$ under the tension of its spring to fly round until the tooth $h'$ on the disk $h$ encounters the stop $h^2$ projecting from the inner frame. As the pin $r'$ continues its revolutions, the arm $t$ is drawn down until its end clears the shoulder $u^2$ (Fig. 5), on a pivoted arm $u$. This arm $u$ is urged by a spring U on its pivot into contact with the arm $t$. The pin $r'$ then slips past the lever $s$, and the spring T on the spindle $c$, (which has been wound up by the movement of the arm $t$) throws the arm $t$ into locking contact with the arm $u$. This prevents further movement of the shaft $c$, and the spring T now acts to turn the inner frame about the axis of the spindle $c$, thereby engaging the wheel $g$ with the wheel $o$, and disengaging wheels $n'$ and $o$. The rotation of the wheel $o$ is now communicated to the wheel $g$ and the pin $g'$ encounters the arm $g^2$, on the spindle $d$ and turns the index $d'$ round the dial. Meanwhile the clock spring turns the wheel $n'$ in the reverse direction the rotation being regulated by the escapement which is geared to the wheel $n'$ through the pinion $q$. When the pin $p'$ meets the end of the arm $u$ it deflects this arm so as to release the arm $t$ and allow the arm $t'$ to spring against the brake disk $h$ and hold it firmly. At the same instant since the spring on the spindle $c$ no longer reacts jointly on the inner and outer frames, the former is returned by the action of the spring attached to the pillar $a^2$ into its original position with the wheels $o$ and $n'$ in gear. The spring $k^3$ acts in this manner because it is connected to the segment $k'$, which is pivoted to and carried by the inner frame. At this time, the said segment is held against movement on its pivot because the engagement of the brake-arm $t$ with the brake-disk $h$ prevents rotation of the shaft $f$ with the pinion $i'$ of which the segment meshes. The wheel $o$ now begins to turn the wheel $n'$ and rewind the clock spring. The pin $r'$ encountering the arm $s$ causes the release of the brake $t'$ and the wheel $g$ returns to its zero position that is, the position in which the tooth $h'$ on the disk $h$ encounters the stop $h^2$ projecting from the inner frame. The index $d'$ however remains stationary on account of the pressure of the arm $m$ on the disk $m'$. As the pin $r'$ slips past the end of the arm $s$ and the arm $t$ is caught by the shoulder of the arm $u$ the inner frame again rotates throwing the wheel $g$ into gear with the wheel $o$ and withdrawing the pin $r'$ out of reach of the arm $m^2$ of the bent lever the other end of which is arranged to bear on the disk $m'$. If it be assumed that the speed is now less than during the previous record, the wheel $g$ does not turn through as great an angle as before and the pin $g'$ does not reach the pin $g^2$ on the spindle $d$ before the inner frame again swings back to the position shown in Fig. 1. When in this position, the pin $r'$ as it revolves touches the arm $m^2$ of the bent lever and raises the other arm $m$ off the disk $m'$ and the spindle $d$ is brought back by the segment $k$ and its controlling spring until the pin $g^2$ strikes the pin $g'$ on the wheel $g$. When the pin $r'$ passes the arm $m^2$ of the bent lever the other arm $m$ presses on the disk $m'$. The pressure is however very light, and when a greater speed has to be recorded the pin $g'$ on the center wheel $g$ turns the spindle $d$ further round in spite of the pressure on the disk $m'$.

For the sake of clearness the spindle of the sector $k'$ and also its spring are omitted from Fig. 2 of the drawings.

1. In speed indicators of the class described, an index shaft, a vehicle driven shaft, intermediate gearing for operating the index shaft from the driven shaft, said gearing including a brake-wheel or disk, a brake arm coöperating therewith, means for checking said brake-wheel or disk at a pre-determined point, and spring and gear means for controlling the brake; substantially as described.

2. In a speed indicator of the class described, an index shaft, means for holding said shaft in a relatively fixed position, a vehicle driven shaft, a spring arranged to be wound from said shaft, intermediate gearing for actuating the index shaft, and a brake device for said gearing, controlled in part by the spring and in part from the drum axle; substantially as described.

3. In a speed indicator of the class described, a relatively fixed frame, an index shaft journaled therein, a vehicle driven shaft also journaled therein, and carrying a gear, a movable inner frame having gearing for actuating the index shaft and also a gear wheel which is arranged to engage in one position, the index shaft actuating gearing, and in another position, to engage the vehicle driven gear, means for causing the movement of the inner frame to shift the engagement of said gear, and brake means for the index shaft operating gear; substantially as described.

In testimony whereof I have signed my name to this specification in the presence of two subscribing witnesses.

JOHN BRADBURY WINTER.

Witnesses:
  M. BURGESS,
  E. BRINDLEY.